(12) United States Patent
Tzankov et al.

(10) Patent No.: US 11,975,405 B2
(45) Date of Patent: May 7, 2024

(54) SYSTEM AND METHOD LASER FOR PROCESSING OF MATERIALS

(71) Applicant: IPG PHOTONICS CORPORATION, Oxford, MA (US)

(72) Inventors: Pancho Tzankov, Oxford, MA (US); Jonathan Ehrmann, Oxford, MA (US); Jeffrey Kmetec, Oxford, MA (US); Alexey Avdokhin, Oxford, MA (US); Andrei Babushkin, Oxford, MA (US)

(73) Assignee: IPG PHOTONICS CORPORATION, Marlborough, MA (US)

( * ) Notice: Subject to any disclaimer, the term of this patent is extended or adjusted under 35 U.S.C. 154(b) by 334 days.

(21) Appl. No.: 16/765,812

(22) PCT Filed: Nov. 20, 2018

(86) PCT No.: PCT/US2018/062062
§ 371 (c)(1),
(2) Date: May 20, 2020

(87) PCT Pub. No.: WO2019/100067
PCT Pub. Date: May 23, 2019

(65) Prior Publication Data
US 2020/0384572 A1 Dec. 10, 2020

Related U.S. Application Data

(60) Provisional application No. 62/588,760, filed on Nov. 20, 2017.

(51) Int. Cl.
B23K 26/06 (2014.01)
B23K 26/067 (2006.01)
(Continued)

(52) U.S. Cl.
CPC ........ *B23K 26/0648* (2013.01); *B23K 26/067* (2013.01); *B23K 26/38* (2013.01);
(Continued)

(58) Field of Classification Search
CPC .. B23K 26/0648; B23K 26/067; B23K 26/38; G02B 27/30; G02F 1/3501; G02F 1/353; G02F 1/3503; H01S 3/08086; H01S 3/067
See application file for complete search history.

(56) References Cited

U.S. PATENT DOCUMENTS

| 4,534,811 A | * | 8/1985 | Ainslie | ................. | B23K 26/06 |
| | | | | | 219/56.22 |
| 4,845,354 A | * | 7/1989 | Gupta | .................... | H01L 24/78 |
| | | | | | 219/121.62 |

(Continued)

FOREIGN PATENT DOCUMENTS

CN 104190928 A * 12/2014 ............. B22F 3/105

OTHER PUBLICATIONS

Feng et al., Optical design of f-theta lens for dual wavelength selective laser melting, Advanced Optical Design and Manufacturing Technology and Astronomical Telescopes and Instrumentation, Proc. of SPIE vol. 10154 101541L-1 (Year: 2016).*

(Continued)

*Primary Examiner* — Peter Radkowski
(74) *Attorney, Agent, or Firm* — Caroline J. Roush, Esq.

(57) ABSTRACT

A multiple wavelength laser processing system is configured with a multiple wavelength laser source for generating a multiple wavelength coaxial laser processing beam. The laser processing system further includes a multiple wavelength optical system to deliver the coaxial laser processing beam to a laser-material interaction zone on the surface of a workpiece such that each of the a first and a second laser
(Continued)

wavelengths in the processing beam impinge at least a portion of the interaction zone as respective first and second concentric laser spots. The multiple wavelength optical system includes a multiple wavelength beam collimator, a configurable chromatic optic, and a laser processing focus lens, wherein the configurable chromatic optic provides an adjustment to the relative focus distance of the first and second laser wavelengths.

19 Claims, 7 Drawing Sheets

(51) Int. Cl.
  *B23K 26/38* (2014.01)
  *G02B 27/30* (2006.01)
  *G02F 1/35* (2006.01)
  *H01S 3/08* (2023.01)
  *H01S 3/067* (2006.01)

(52) U.S. Cl.
  CPC ........... *G02B 27/30* (2013.01); *G02F 1/3501* (2013.01); *G02F 1/353* (2013.01); *H01S 3/08086* (2013.01); *G02F 1/3503* (2021.01); *H01S 3/067* (2013.01)

(56) References Cited

U.S. PATENT DOCUMENTS

| | | | | |
|---|---|---|---|---|
| 5,083,007 A * | 1/1992 | Spletter | B23K 26/0604 | 219/121.64 |
| 5,442,436 A * | 8/1995 | Lawson | G02B 27/30 | 356/153 |
| 5,611,946 A * | 3/1997 | Leong | B23K 26/0665 | 257/E21.526 |
| 5,703,713 A * | 12/1997 | Leong | B23K 26/0665 | 257/E21.526 |
| 5,811,751 A * | 9/1998 | Leong | G02B 26/023 | 257/E21.526 |
| 5,963,364 A * | 10/1999 | Leong | H01L 22/22 | 359/489.07 |
| 6,210,401 B1 * | 4/2001 | Lai | B23K 26/032 | 606/4 |
| 6,281,471 B1 * | 8/2001 | Smart | H01L 21/76894 | 257/E23.15 |
| 6,407,363 B2 * | 6/2002 | Dunsky | B23K 26/08 | 219/121.69 |
| 6,587,487 B2 * | 7/2003 | Yin | H01S 3/109 | 372/98 |
| 6,621,040 B1 * | 9/2003 | Perry | B23K 26/18 | 219/121.72 |
| 6,621,044 B2 * | 9/2003 | Jain | G03F 7/70216 | 250/492.1 |
| 6,664,498 B2 * | 12/2003 | Forsman | B23K 26/0622 | 219/121.85 |
| 6,784,399 B2 * | 8/2004 | Dunsky | H01S 3/115 | 219/121.68 |
| 7,088,749 B2 * | 8/2006 | Nakayama | H01S 3/109 | 372/28 |
| 7,396,706 B2 * | 7/2008 | Sun | B23K 26/0622 | 219/121.69 |
| 7,505,196 B2 * | 3/2009 | Nati | H01S 3/1112 | 359/333 |
| 7,645,337 B2 * | 1/2010 | Im | C30B 13/22 | 117/37 |
| 8,158,493 B2 * | 4/2012 | Shah | B23K 26/0624 | 257/E21.48 |
| 8,734,584 B2 * | 5/2014 | Im | C30B 13/22 | 117/200 |
| 8,946,586 B2 * | 2/2015 | Bea | B23K 26/0734 | 219/121.64 |
| 9,321,126 B2 * | 4/2016 | Xu | B23K 26/00 | |
| 9,764,427 B2 * | 9/2017 | Sercel | B23K 26/38 | |
| 9,956,646 B2 * | 5/2018 | Mendes | B23K 26/0604 | |
| 10,286,487 B2 * | 5/2019 | Kancharla | B23K 26/0665 | |
| 10,343,237 B2 * | 7/2019 | Sercel | B23K 26/0853 | |
| 10,610,962 B2 * | 4/2020 | Kaiser | B23K 26/32 | |
| 10,722,979 B2 * | 7/2020 | Imoto | B23K 26/211 | |
| 10,807,199 B2 * | 10/2020 | Sercel | B23K 26/0853 | |
| 11,077,526 B2 * | 8/2021 | Kleinert | B23K 26/382 | |
| 11,433,483 B2 * | 9/2022 | Avdokhin | B23K 26/0608 | |
| 2001/0045419 A1 * | 11/2001 | Dunsky | B23K 26/042 | 219/121.61 |
| 2002/0050488 A1 * | 5/2002 | Nikitin | B23K 26/0608 | 219/121.64 |
| 2002/0130279 A1 * | 9/2002 | Jain | G03F 7/70358 | 250/494.1 |
| 2003/0035448 A1 * | 2/2003 | Yin | H01S 3/109 | 372/22 |
| 2003/0043452 A1 * | 3/2003 | Heist | G02F 1/3534 | 359/326 |
| 2003/0160034 A1 * | 8/2003 | Filgas | B23K 26/0624 | 219/121.68 |
| 2004/0131092 A1 * | 7/2004 | Nakayama | H01S 3/109 | 372/21 |
| 2005/0111500 A1 * | 5/2005 | Harter | H01S 3/0057 | 372/18 |
| 2005/0184035 A1 * | 8/2005 | Kurosawa | B23K 26/389 | 219/121.72 |
| 2005/0225846 A1 * | 10/2005 | Nati | H01S 3/06779 | 359/341.1 |
| 2006/0065640 A1 * | 3/2006 | Lizotte | B23K 26/064 | 219/121.61 |
| 2009/0245294 A1 * | 10/2009 | Alkulov | H01S 3/109 | 372/6 |
| 2010/0197116 A1 * | 8/2010 | Shah | H01L 21/268 | 219/121.68 |
| 2010/0206857 A1 * | 8/2010 | Bea | B23K 26/0734 | 219/121.64 |
| 2011/0240617 A1 * | 10/2011 | Xu | B23K 26/00 | 219/121.72 |
| 2013/0134139 A1 * | 5/2013 | Duerr | B23K 26/0622 | 219/121.63 |

OTHER PUBLICATIONS

Liu et al., Effect of high-temperature preheating on the selective laser melting of yttria-stabilized zirconia ceramic, Journal of Materials Processing Technology 222 (2015) 61-74 (Year: 2015).*
Michael Greenstein, "Optical absorption aspects of laser soldering for high density interconnects," Appl. Opt. 28, 4595-4603 (1989) (Year: 1989).*
Feng et al., Optical design of f-theta lens for dual wavelength selective laser melting, Advanced Optical Design and Manufacturing Technology and Astronomical Telescopes and Instrumentation, 2016, Proc. of SPIE vol. 10154 101541L-1 (Year: 2016).*
Avdokhin et al., High average power quasi-CW single-mode green and UV fiber lasers, Proc. SPIE 9347, Nonlinear Frequency Generation and Conversion: Materials, Devices, and Applications XIV, 934704 (Feb. 27, 2015). (Year: 2015).*
J. Lin, X.-C. Yuan, S. H. Tao, and R. E. Burge, "Collinear superposition of multiple helical beams generated by a single azimuthally modulated phase-only element," Opt. Lett. 30, 3266-3268 (2005) (Year: 2005).*
Giovanni Sartorello, Nicolas Olivier, Jingjing Zhang, Weisheng Yue, David J. Gosztola, Gary P. Wiederrecht, Gregory Wurtz, and Anatoly V. Zayats, Ultrafast Optical Modulation of Second- and Third-Harmonic Generation from Cut-Disk-Based Metasurfaces, ACS Photonics 2016 3 (8), 1517-1522, (Year: 2016).*
Amako et al., Design and fabrication of a diffractive beam splitter for dual-wavelength and concurrent irradiation of process points, Opt. Express 24, 16111-16122 (2016) (Year: 2016).*
Fitzgerald et al., Extending the Depth of Field in a Fixed Focus Lens Using Axial Colour, in Optical Design and Fabrication 2017 ( Freeform, IODC, OFT), OSA Technical Digest (online) (Optica

(56) References Cited

OTHER PUBLICATIONS

Publishing Group, 2017), paper ITh4A.4. International Optical Design Conference 2017, Jul. 9-13, 2017.*

Hess et al., Continuous Wave Laser Welding of Copper with Combined Beams at Wavelengths of 1030nm and of 515nm, Physics Procedia, vol. 12, Part A, 2011, pp. 88-94, ISSN 1875-3892, https://doi.org/10.1016/j.phpro.2011.03.012. (Year: 2011).*

Olsovsky et al., Chromatic confocal microscopy for multi-depth imaging of epithelial tissue, Biomed. Opt. Express 4, 732-740 (2013) (Year: 2013).*

Korner et al., New approaches in depth-scanning optical metrology, Proc. SPIE 5457, Optical Metrology in Production Engineering, (Sep. 10, 2004); https://doi.org/10.1117/12.554754 (Year: 2004).*

Liu, J.M. "Simple technique for measurements of pulsed Gaussian-beam spot sizes", Optics Letters, vol. 7, No. 5, May 1982. pp. 196-198.

\* cited by examiner

FIG. 3
Prior Art
| Absorption Ratio | IR:GR | IR:UV | IR:DUV |
|---|---|---|---|
| Steel | 75% | 50% | 30% |
| Copper | 5% | 1% | 1% |
| Gold | 10% | 5% | 2% |
| Silver | 50% | 5% | 1% |
| Aluminum | 50% | 50% | 50% |
| Silicon | 0.10% | 0.0001% | 0.00001% |
| BK7 | 100% | 1% | 0.10% |
| Sapphire | 100% | 50% | 15% |
| Gorilla Glass | 100% | 100% | 1% |
FIG. 4A
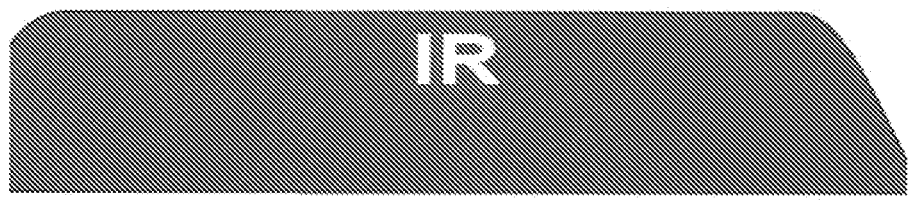
FIG. 4B  GR
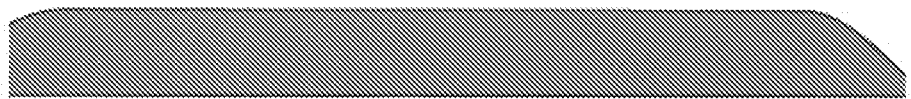
FIG. 4C  UV
FIG. 4D  DUV

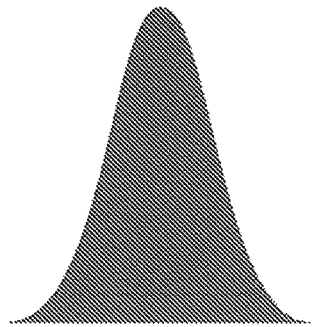 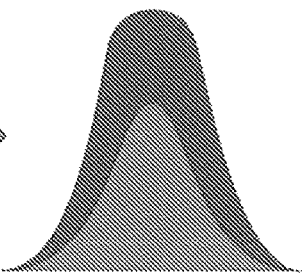 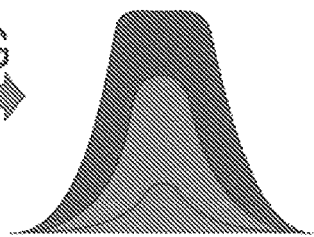
FIG. 5A  FIG. 5B  FIG. 5C
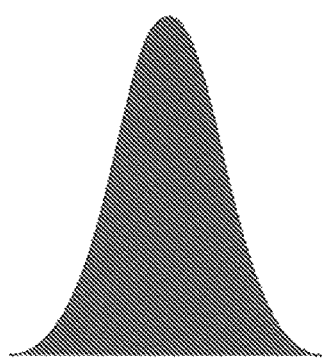 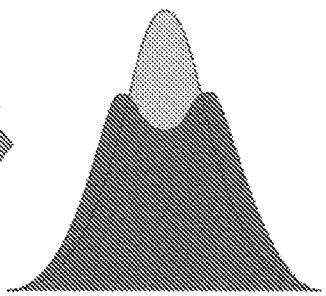 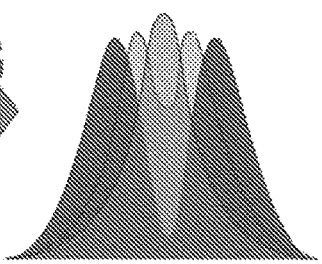
FIG. 6A  FIG. 6B  FIG. 6C

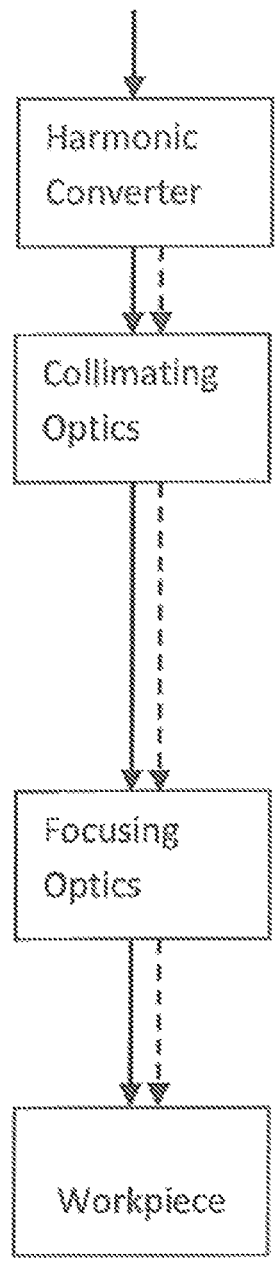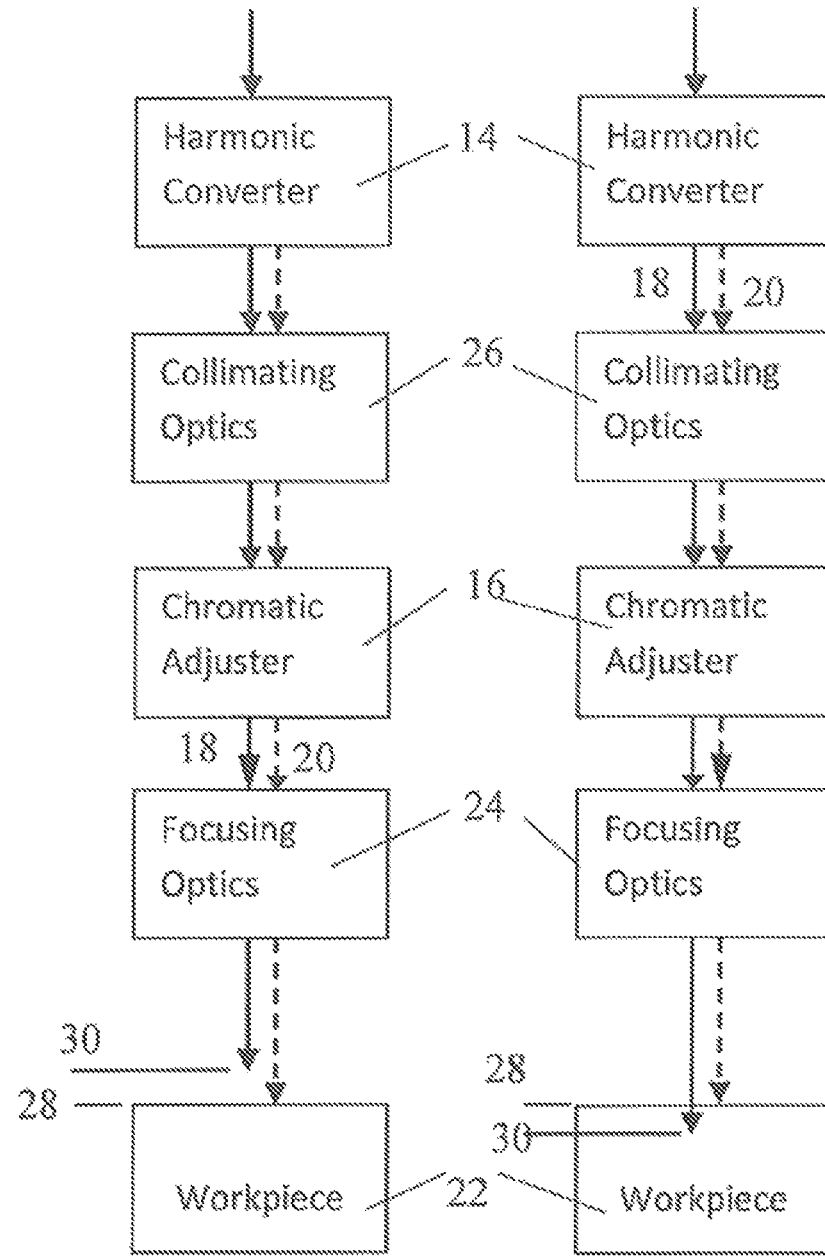
FIG. 7
Prior Art
FIG. 8A
FIG. 8B

SYSTEM AND METHOD LASER FOR PROCESSING OF MATERIALS

BACKGROUND OF THE DISCLOSURE

Field of the Disclosure

The present disclosure relates to a cost-efficient, fiber laser system and method for processing materials with beams at fundamental and harmonic wavelengths propagating coaxially through a lens system which generates chromatic aberration. The disclosure further relates to the beams impinging upon the material with respective beam focuses which are spaced apart such that a fluence ratio of the beams is at least equal to the inverse absorption ratio of these beams by the material, wherein the beam at the harmonic wavelength provides a material state change which increases the absorption coefficient of the material for the beam at the fundamental wavelength.

Background Art Discussion

Laser processing has been associated with a wide variety of materials including polymers, metals, glasses and ceramics. The type of laser that is used for each material is chosen to match the optical absorption characteristics of the material. This however is not straightforward for numerous materials because they have dramatically different properties. Some materials have surfaces that reflect certain wavelengths, but under certain thermal conditions, allow otherwise reflected beams to propagate through. Still other materials selectively absorb certain wavelengths. And yet other materials simply cannot be effectively processed by one group of wavelengths, whereas the other wavelength group is highly effective for processing these materials.

Many products are manufactured from materials characterized by high reflectivity in ultraviolet (UV) to infrared (IR) wavelength range. This group of materials includes, among others, silicon (Si), copper (Cu), bronze, brass, aluminum (Al), stainless steel with a mirror polish, silver (Ag), gold (Au), platinum (Pt), and alloys of the above mentioned materials. These materials may reflect up to 92% of visible light and up to 98% of infrared radiation at room temperature. Needless to say the materials mentioned above along with other similar/materials are critical in numerous industrial applications.

The US 2013/0134139 publication application (US '139) is one publication recognizing the above-discussed problem. It discloses a fiber laser system for processing highly reflective materials by laser generated light in a 700-1200 nm wavelength range. The reference discloses a conceptually simple process including simultaneous irradiation of the materials of interest with two beams at respective fundamental and doubled frequency. The Green beam at the doubled frequency melts the irradiated surface leading to a more efficient absorption of the IR light at the fundamental frequency. This irradiation at two different frequencies of the material of interest is well known in the art from, for instance, U.S. Pat. No. 5,083,007.

The solution disclosed in US '139 includes controlling the pulse shape by spiking IR light intensity over a short, initial time of each pulse which leads to higher wavelength conversion efficiency of the IR beam into the Green beam. The generated Green beam raises the temperature of the irradiated material to a melting temperature which increases the absorption of the Red light. The power profile of each pulse after the initial peak power spike is controlled by minimizing the peak power of the IR light to the end of each pulse.

Considering the operation of the disclosed method and equipment of the US '139, it is helpful to evaluate its cost efficiency. On a large industrial scale, relatively low-cost devices capable of effectively functioning translate into higher profits. Within the context of laser-treating processes of the materials of interest, the low cost and effectively functioning laser systems include a plethora of considerations challenging the designer. For example, fiber lasers are making a significant impact on the industrial manufacturing market due to its low cost, low maintenance and increased efficiency in comparison to Nd:YAG lasers of U.S. Pat. No. 5,083,007. The US '139 teaching a quasi-continuous fiber laser may have a few disadvantages which drive up its cost efficiency. Aiming at high conversion efficiency even for a short time, this reference teaches a coherent, narrowband laser associated with the desired high conversion efficiency. However narrowband fiber lasers with a spectral width of less than 2 nm may come at high costs and lower peak power. Controlling a pulse power profile requires sophisticated control circuits which may only add to the cost of the disclosed equipment. In summary, the disclosed equipment may not be economically attractive for a large-scale material laser processing business.

A need therefore exists for a simple, cost-efficient material processing laser system.

Another need exists for a simple, cost-efficient material processing fiber laser system to efficiently process metal, dielectric or composite materials that are not processed well or are processed at excessive average powers at the fundamental frequency of the fiber lasers.

Still another need exists for a simple, cost-efficient modular material processing fiber laser system operative to limit the average laser power or pulse energy which is coupled into the material and usually dissipated in the form of heat.

Yet another need exists for the above noted fiber laser system configured with beam guiding optics which is operative to provide necessary conditions for energy efficient processing.

SUMMARY OF THE DISCLOSURE

In its basic configuration, the disclosed laser processing system is configured with a laser source outputting a first beam at a fundamental wavelength with a spectral width of at least 2 nm. Utilizing a high harmonic wavelength generator the first beam is converted once or multiple times to generate at least one second beam at at least one harmonic wavelength. The beams are propagated coaxially by an optical system delivering them to the material where one of the beams, typically the second beam at the harmonic wavelength is at least partially absorbed to induce a change of the material state in which the absorption of the beam at the fundamental wavelength is increased. It should be noted that in limited cases the inducement of the material state change is caused by the second beam at the harmonic wavelength.

The material state change may be induced on a macro level including temperature changes and a transition among solid/liquid/gas/plasma phases of the irradiated material. Alternatively, the material state can occur on a micro level switching the material from ground or excited state to another excited or ionized or transition state leading to a chemically modified change.

Typically, the focus of the second beam is located on the surface of the material. However depending on material and/or harmonic wavelength, a focus of the second beam may be closely spaced from the surface in axial directions. Once a threshold at which the material changes its state is reached, the absorption of the first beam is markedly increased resulting in the improved efficiency of the task at hand. In those rare cases where the first beam at the fundamental wavelength first heat the surface so as to increase the coefficient of absorption for the second beam, the relationship between the focuses of respective beams remains unchanged.

One aspect of the disclosed systems is the generation of chromatic aberration, which is not typical in the laser material machining art which often discloses achromatic lenses or lens systems. Accordingly, the disclosed optical beam delivering system is configured with a lens or lens system that is chromatic.

The chromatic lens is configured to collect light at multiple different wavelength and focus them at different focal heights relative to the surface. The chromatic aberration is generally axial, i.e., along the beam propagation path. Lateral chromatic aberration may be or may remain corrected in the chromatic system.

Another aspect of the disclosed system complements the chromatic aberration and advantageously distinguishes the currently disclosed structure from those of the known prior art. Briefly revising the US '139, it teaches optimizing the energy balance by controlling the power profile of each pulse. The pulse shape control is designed to initially increase IR peak power to efficiently generate Green light so as to reach a melting temperature and then gradually decrease the peak power by the end of each pulse. In other words, the efficiency of the processing system to treat material is controlled by varying the wavelength conversion efficiency during each pulse.

Thus a further aspect of the disclosure including the above-mentioned feature emphasizes controlling two or more coaxial beams at respective fundamental and harmonic wavelengths. In at least one embodiment, the disclosed system is configured with a processor for controlling a fluence ratio between the beams to be at least equal to the inverse absorption coefficients ratio at which the second beam provides a material state change. In a simple illustration of the above advantages of the disclosed system, a 10 kW fiber laser source typical of prior art systems is replaced with a substantially less powerful laser, for example a 1 kW fiber laser with a small portion of its power converted to different harmonic wavelength.

In practical terms, this control may be fulfilled by setting or adjusting the relative focus distance of the first and second beams with the chromatic optics disposed and possibly displaced along the light path. By doing so the diameter ratio of first and second laser spots associated with respective first and second beams at the surface is controlled to vary the fluence ratio. The chromatic optic may be removed from the path of the coaxial beam and subsequently replaced by another system configured to provide different focal distances, different diameter ratio, and thus different fluence ratio.

In still another aspect of the disclosed system, the beam delivering system includes an achromatic collimator provided with one or more reflective surfaces. This feature has been found particularly useful in the disclosed system with the beam at a fundamental wavelength and multiple harmonic beams, such as Green and ultraviolet (UV) or Green, UV and deep UV (DUV). The preservation of the beams' parallelism plays a particularly important role in light of the chromatic lens system and desired focal distance differences providing the desired fluence ratio. The collimator is advantageously configured without refractive elements due to extremely high tolerances on lateral chromatic effects. Any desired chromatic aberration in the system may be accommodated in the full optical system immediately upstream from the chromatic lens.

Yet another aspect of the disclosed system provides an analytical determination of the ratio of the energy thresholds of the material state changes for each of the incident beams. The energy threshold determination was developed by J. M Liu in the paper "Simple technique for measurement of pulsed Gaussian-beam spot size" Optics Letters, Vol. 7, May 1982 fully incorporated herein by reference. In particular, the energy of each of the multiple beams delivered to the workpiece to be machined is determined as $$Eth(\lambda)/Ethall(\lambda) > 1,$$

wherein $Eth(\lambda)$ is the energy threshold of each individual beam which is needed to process the workpiece alone without the assistance of other wavelengths, and $Ethall(\lambda)$ is the energy threshold of the same laser beam in the composite beam of the disclosure, i.e. when all wavelengths are present simultaneously.

The wavelength converter implemented in all aspects of this disclosure is not limited to a nonlinear crystal (NLC). It may also be a Raman crystal or even a Raman fiber—amplifier and oscillator—receiving the beam at the fundamental wavelength from the fiber laser source. Alternatively an optical parametric amplifier or oscillator may be used as well. Incorporating the parametric and Raman conversion schemes allows generating spectrally tunable wavelength that may be more efficient in changing the surface state of some processing materials than the limited number of harmonics at fixed harmonic wavelength of the beam at the fundamental wavelength.

When laser beams impinge on a material, the energy coupling is determined by the absorption. The temperature of the material rises to increase its heat dissipation. For an intense laser, the temperature can rise beyond melting and vaporization temperatures, and the material becomes an ionized plasma. In this situation, the subsequent laser absorption is determined by the plasma properties, such as density and temperature. In many materials processing applications, creating a plasma facilitates the absorption of the laser energy. This is the subject matter of another aspect of the disclosure that may help operation of the disclosed system in each of the above discussed aspects.

The above discussed aspects include specific features of the disclosed laser system which implements respective steps of the disclosed method. Hence all of the above-discussed aspects and some additional features which are disclosed below in the specific description directly relate to the disclosed method. Each of the above-disclosed aspects includes a feature or features that can be practiced with features of any combination of the discussed aspects.

BRIEF DESCRIPTION OF THE DRAWINGS

The above and other features and advantages of the present disclosure will become more readily apparent from the specific description and claims accompanied by the following drawings, in which:

FIG. 3 is a table illustrating the known absorption ratio of beams at fundamental and harmonic wavelengths by multiple materials.

FIGS. 4A-4D illustrate pulse shapes of light at IR, Green, UV and DUV wavelengths.

FIGS. 5A-5C and FIGS. 6A-6C illustrate a pulse shape dependence on the wavelength conversion efficiency.

FIG. 7 is a flow chart representing the known laser machining process.

FIGS. 8A and 8B are respective flowcharts of the disclosed laser machining process.

SPECIFIC DESCRIPTION

The basic concept of this disclosure includes laser treating a workpiece with two or more laser beams at different wavelengths which are differently absorbed by the material to be treated at room temperature. The energy of one of the beams at the wavelength, which is absorbed more effectively than that of the other beam at room temperature, is coupled into the material inducing a material state change. With the material change occurred, the workpiece effectively absorbs the other beam or beams at respective wavelengths. Optimization of the disclosed process allows the disclosed method and system successfully treat practically any material. For example, it can be glass, sapphire, ceramics, copper, corroded metals, thin metals, biotissues, PCBs and silicon wafers.

Figure 1:
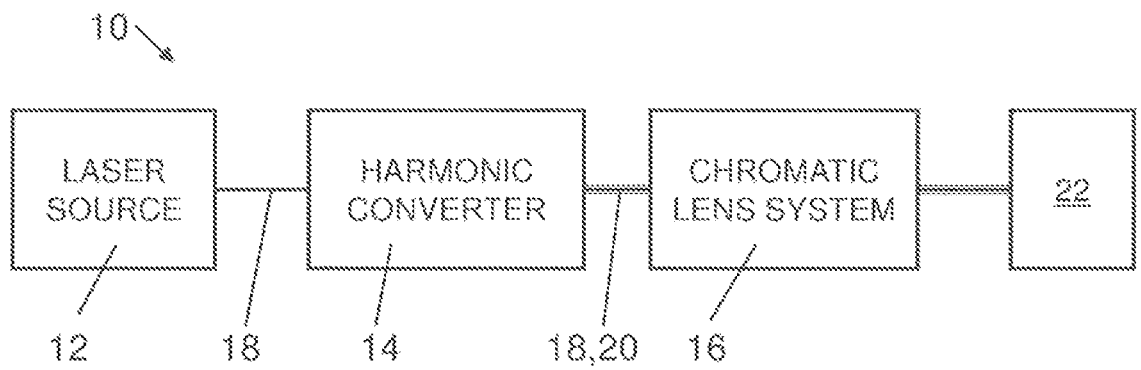
FIG. 1 is an exemplary disclosed system.

FIG. 1 illustrates a general layout of a disclosed material processing system 10. The illustrated configuration includes a laser source 12 outputting a broadband unpolarized beam 18 at a fundamental wavelength with a spectral line ranging between 2 nm and hundreds of nm. While laser source 12 may have a variety of configurations, preferably it is a fiber laser that can operate in all three regimes: continuous wave (CW), quasi CW (QCW) and pulsed. In QCW or pulsed regimes, laser source 12 outputs a train of pulses each having a pulse energy in a µJ–J range, pulse duration in a seconds-femtosecond range, and average power between single-digit watt and hundreds of kilowatts. While many industrial applications require that output beam 18 have the highest quality with a factor $M^2$ of 1, the disclosed method and system can also efficiently operate with a multimode beam having the $M^{20}f$ up to 100 in other applications.

The generation of other beams at respective wavelengths different from that of beam 18 is realized by a harmonic frequency generator 14. The latter may operate on a basis of different physical mechanisms, but ultimately regardless of the configuration, generator 14 is operative to partially convert the wavelength of beam 18 to a different wavelength of beam 20 with a spectral line width exceeding 0.5 nm. Within the scope of the disclosure, frequency harmonic generator 14 may be operative to use a variety of conversion processes including frequency doubling, sum and difference frequency generation in nonlinear crystals, parametric oscillation and amplification in nonlinear crystal materials, and Raman conversion in bulk crystals or in optical fibers. Examples of specific optical schematics are discussed in detail below.

Propagating along the light path in a coaxial manner, beams 18 and 20 impinge on a chromatic adjuster 16 configured with one or multiple lenses as explained below.

The chromatic adjuster 16 generates an axial chromatic aberration between the first and second beams which further impinge simultaneously a workpiece made from material 22. When using chromatic adjuster 16, beam 18 at the longer wavelength will have a focus farther from that of beam 20 at the shorter wavelength which is on or near the surface of material 22. As a consequence, at the focal point of beam 20, beam 18 forms a spot diameter larger than that of beam 20. Hence the intensity of beam 18 at the longer wavelength at the focal point of beam 20 is significantly lower than at its own focal point. Because of the difference in spot diameters, the fluence ratio between beams 20 and 18 is usually 2-10 times higher, depending on the material of chromatic system 16, than in case of achromatic lens systems of the prior art, wherein the fluence is the pulse energy per beam areas in case of QCW and pulsed lasers, and power per beam area for CW lasers.

The fluence ratio is important for disclosed system 10 that is configured to control a minimal amount of beam 20 needed to provide the desired material state change leading to the increased absorption of beam 18 and thus to more efficient use of the entire system. Note that utilizing high power laser source 12, typically beam 18, such as an IR beam, can laser treat many materials, but the use of only one IR beam 18 would lead to unacceptably inefficient process. The same relates to any other single wavelength light that in principle may individually treat material 22, but may render the laser treatment process inefficient. The use of multiple beams instead of processing the same material with one beam can be analytically expressed as $$Eth(\lambda)/Ethall(\lambda)>1,$$

wherein $Eth(\lambda)$ is the energy threshold of each individual beam which is needed to process the workpiece alone without the assistance of other wavelengths, and $Ethall(\lambda)$ is the energy threshold of the same laser beam in the multi-beam of the disclosure, i.e. when all wavelengths are present simultaneously. When the above is met the efficiency of the process utilizing the disclosed system can be enhanced by orders of magnitude in some applications. Typical pulse energies in the applications with multiple beams are 4-5 times the single pulse threshold energies Eth.

Figure 2:
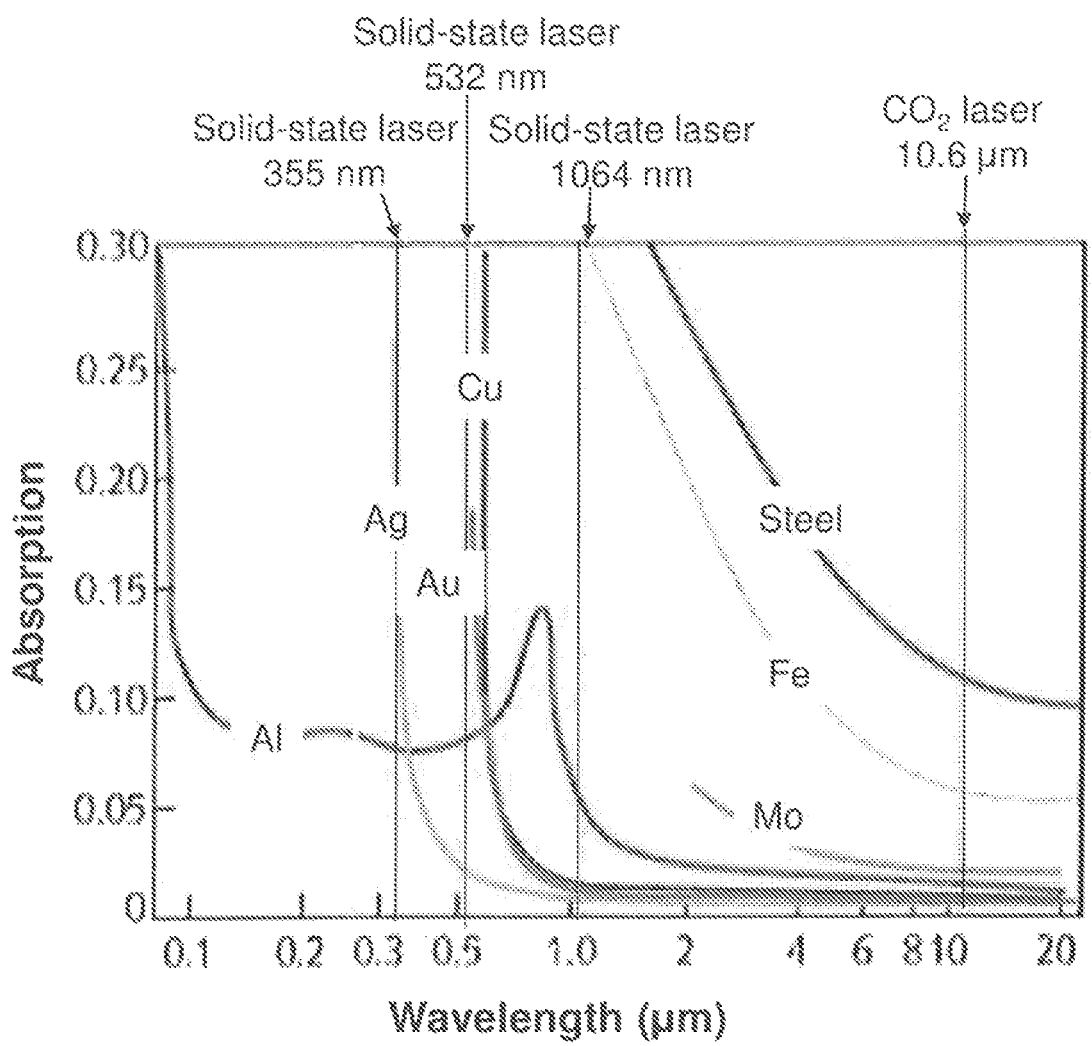
FIG. 2 is the absorption of multiple materials dependence on a wavelength.

The fluence ratio between beams 20 and 18 in system 10 is obtained on the basis of well documented dependence of absorption according to wavelength for various materials at ambient temperature, as shown in FIG. 2. The inventors discovered that in order to induce the desired material state change, the fluence ratio should be at least equal to or larger than the inverse absorption ratio for the same beams in material 22. Some of the absorbance ratios are illustrated in FIG. 3, wherein IR is infrared, GR is green, UV—ultraviolet and DUV is deep UV. Numerous techniques for measuring and controlling fluence are known to one of ordinary skill in the art and not disclosed here in detail. It should be noted that in the disclosed system the fluence of respective beams is measured separately.

The fluence ratio can be adjusted by several techniques. One of the techniques includes manipulating the chromatic aberration of chromatic adjuster 16 by replacing currently installed lens set with a different one which may be made from different materials, such as Fused Silica (FS), magnesium fluoride (MGF2), calcium fluoride (CAF2) and others. Still another technique provides for adjusting the conversion efficiency. The selection of chromatic adjuster 16 appropriate for the task at hand can be realized by any mechanical method including an automated lens delivering mechanism. The techniques for adjusting parameters of the wavelength conversion are also well known to one of ordinary skill in the laser arts and may include controllably varying the geometry and temperature of NL crystals or the length of Raman fiber and many others. While the conversion is controllably adjusted, the power profile of pulses, as shown in FIGS. 4A-4D, remains practically unchanged.

Typically the laser used in laser material processing are configured narrow band and polarized to provide good harmonic conversion efficiencies. However, the high conversion efficiency comes with significant degradation of the fundamental beam profile, as shown in FIGS. 6A-6C illustrating a gradual transformation of Gaussian profile to a donut-shaped profile through subsequent second and third harmonic conversions. The donut-shaped profile is generally detrimental except for a very few applications. Most of the times, a Gaussian-profile beam is used. Both the low conversion efficiency and broad spectral line decrease the efficiency which leads to a relatively unmodified Gaussian profile as shown in FIGS. 5A-5C. Thus, low conversion efficiency is beneficial for generating multiple beams from a single laser, as disclosed here, and provides a good beam quality for all of the beams. For the purposes of this disclosure, the low conversion efficiency for Green beam 20 is less than 20%, whereas high efficiency may be more than 50%; for UV light anything below 10% is considered low, whereas the conversion efficiency above 30% is high.

FIG. 7 illustrates an optical schematics with an achromatic aberration typically used in the known prior art. Note that both beams impinging the workpiece are focused on its surface.

FIGS. 8A and 8B illustrate respective optical configuration of disclosed system 10. As mentioned above, beam 18 at the first wavelength is converted in harmonic converter 14 such that at least two coaxial beams 18, 20 at respective longer and shorter wavelengths are collimated in collimating optics 26. The collimated beams are received by chromatic adjuster 16.

With broadband laser source 12 and with multiple laser wavelengths, a monochromatic processing lens design will generally exhibit so-called chromatic aberrations. These aberrations are a result of material dispersion, variations in the index of refraction with wavelength. With different indices of refraction, the focal length of the lens depends on the wavelength, and results in axial chromatic aberration where different wavelengths focus at different focal distances.

The chromatic adjuster may have a variety of configurations. For example, an air-spaced chromatic doublet of suitable optical materials may be used as a chromatic corrector to adjust the beam collimation of one wavelength relative to another as input to the processing lens to correct axial chromatic aberrations of a processing lens or to intentionally add chromatic aberration for focal distance separation at multiple wavelengths.

The chromatic doublet may have a long focal length or infinite focal length (i.e. afocal) at one wavelength to maintain beam collimation. The doublet may be air-spaced and utilize a combination of durable optical glass and crystalline laser materials. In particular with high power lasers and an ultraviolet wavelength, a combination of FS, MGF2, and CAF2 may be used. In combination with the material of the processing lens, two materials can correct or separate focal distances at two wavelengths and three materials can correct or separate focal distances at three wavelengths. To increase the focal distance for example, at 1064 nm relative to a shorter wavelength, the doublet may include a positive element with a relatively high dispersion and a negative element with a relatively low dispersion. For example, the doublet may include a positive FS element and a negative CAF2 element with nearly equal focal lengths. It will be appreciated that more complex chromatic corrector optical designs with more than 2 optical elements may be required for correcting other optical aberrations such as spherical aberration.

Thereafter the beams 18, 20 are focused by focusing optics 24 to have respective desired beam spot diameters. Delivered to a laser-material interaction zone on the surface of workpiece 22, beams 18, 20 impinge the surface as respective first and second concentric laser spots. In FIG. 8A, chromatic adjuster 16 is configured such that focus 28 of second beam 20 of first beam is located upstream from the surface of workpiece 22, whereas in FIG. 8B focus 30 lies below the surface. In both configurations, a focus 28 of converted beams 20 is on the surface of workpiece 22. Still a further configuration of the disclosed beam delivering optics may have the same configuration as shown in FIG. 7, but the focusing optics of the prior art schematic is configured with chromatic aberration.

The laser spot diameter ratio between beams 18 and 20 is adjusted by configuring chromatic adjuster 16 such that the smaller concentric spot is less than ½ the diameter of the larger concentric spot. The chromatic adjuster may be configured with interchangeable sets of chromatic optics 16 each set defining respective focus distance which are different from one another.

Figure 9:
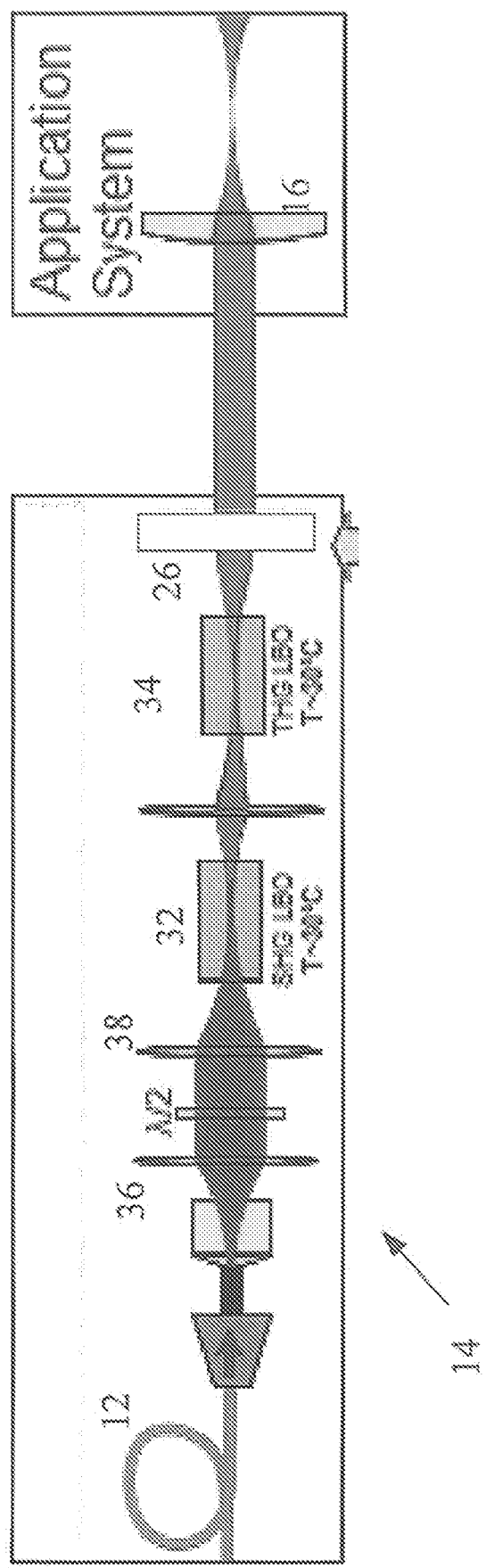
FIGS. 9-11 illustrate respective wavelength conversion schematics based on non-linear crystals and used in the disclosed laser system of FIG. 1.
Figure 10:
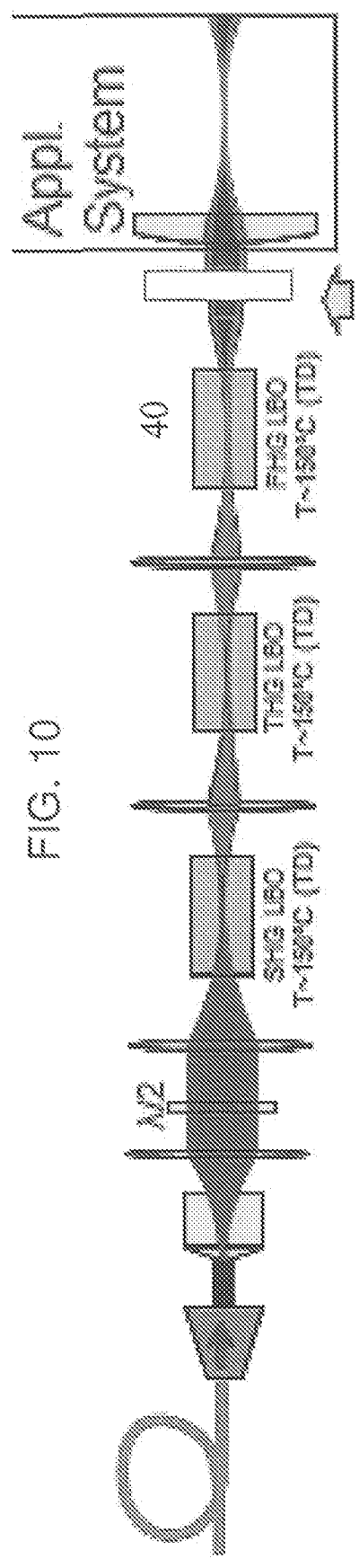
Figure 11:
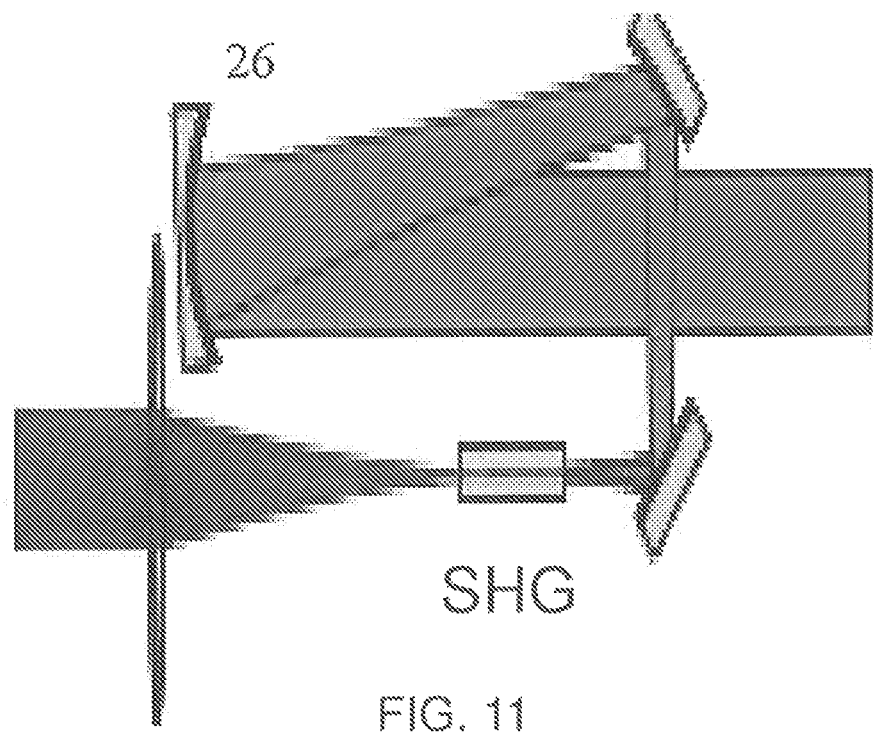

FIGS. 9-13 disclose various configurations of harmonic converter 14. The illustrated architectures of the converter 14 may include a single-pass scheme as shown in FIGS. 9-11 or multi-pass conversion scheme seen in FIGS. 12 and 13.

Figure 12:
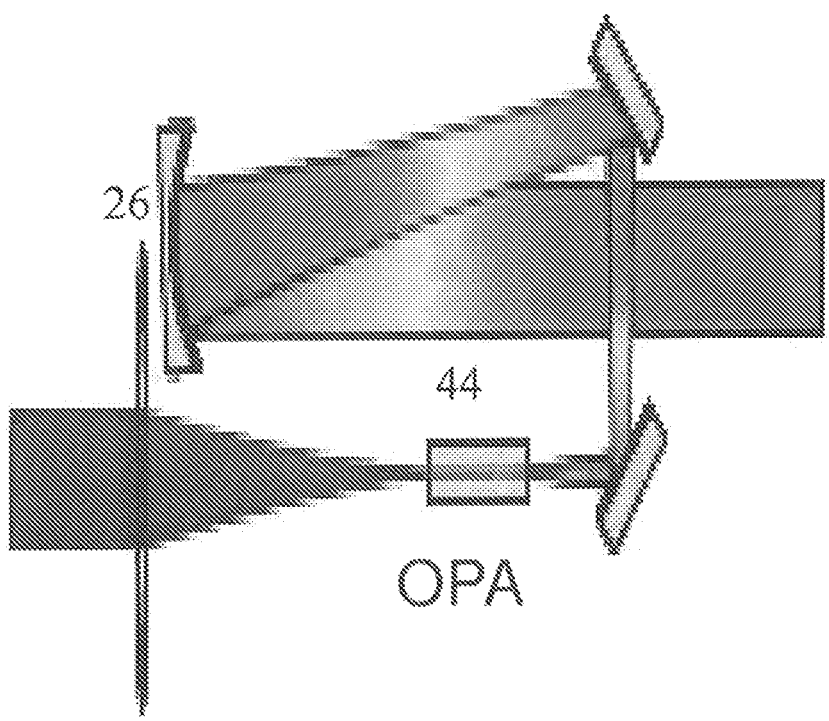
FIGS. 12 and 13 illustrate respective Raman and parametric wavelength conversion schematics.

Referring specifically to FIGS. 9-10 converter 16 is operative to generate second harmonic and third harmonic frequencies by utilizing nonlinear type I crystals 32 and 34, such as lithium triborate (LBO). In operation, beam 18 emitted from laser 12 is incident on a collimating lens 36, that rotated by a half wavelength plate and focused within the body of crystal 32 such that beams 18 and 20 propagate thereafter in the coaxial manner. As readily understood, if the schematic of FIG. 9 had only crystal 32, converter 14 would output only two beams as depicted in FIG. 12. But because second crystal 34 is incorporated, the shown schematic is operative to generate third harmonic as well whereas the lens between the crystals is shown for convenience although in reality it is one or more spherical mirrors.

All of the beams are concentric with the outer beam being beam 18 and innermost beam being the third harmonic beam. The collimating optics 26 is placed along the light path downstream form crystal 34 and may be configured as one or more spherical mirrors. The chromatic adjuster 16, as shown is located immediately downstream from collimator 26. FIG. 10 has a structure identical to the structure of FIG. 9, but in addition to second and third harmonics, it is operative to generate a fourth harmonic by a third crystal 40.

Figure 13:
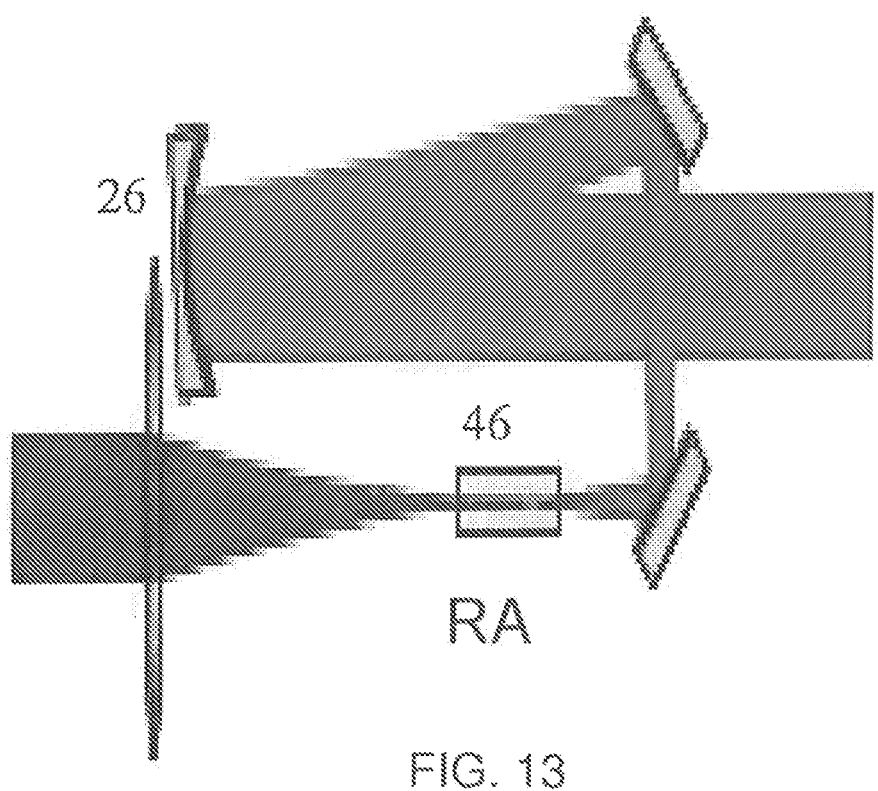

FIGS. 11-13 illustrate a multipass conversion system. In FIG. 11, the schematic is operative to generate a second harmonic with collimating optic configured to as achromatic, all-reflective collimator 26. FIG. 12 illustrates an alternative harmonic generation by utilizing optical parametric amplifier (OPA) 44. It has a spectral tunability between 0.2-2 µm by varying one or more parameters of the system such as temperature and/or crystal rotation and/or time delay, to name a few. It is typically realized in multiple nonlinear crystals in series or in a cavity functioning as an optical parametric oscillator (OPO). FIG. 13 illustrates a Raman amplifier which can be configured as Raman fibers or Raman crystal 46 or Raman fluids. Similarly to the OPO, it can be realized in a cavity to function as a Raman oscillator.

Having described the embodiments of the present invention with reference to the accompanying drawings, it is to be understood that the invention is not limited to those precise embodiments. For example, system 10 may be configured with a long pulse IR source with a coaxial, temporally preceding high intensity (ns/ps) pulse of IR/Green/UV/DUV, MM IR beam, with a coaxial single mode IR to create the material state change in the focus, and others. Thus it is understood that various changes, modifications, and adaptations may be effected therein by one skilled in the art without departing from the scope or spirit of the invention as defined in the appended claims.

The invention claimed is:

1. A laser machining method of a workpiece comprising:
    partially converting a first broadband unpolarized fiber laser beam at a fundamental wavelength into at least one second beam at a harmonic wavelength;
    guiding the first beam and one second beam along a path with the first and second beams being coaxially and temporally overlapped along the entire path;
    simultaneously impinging the first and one second beams upon a surface of the workpiece having different absorption coefficients at respective fundamental and harmonic wavelengths; and
    controlling a fluence ratio between the first and one second beams to be at least equal to greater than the inverse absorption coefficients ratio at which the second beam provides a material state change and has a local plane closer to the surface than a focal plane of the first beam so as to increase an absorption coefficient of the workpiece for the first beam, the first and one second coaxially and temporally overlapped beams focused simultaneously at the different focal plane heights,
    wherein controlling the fluence ratio includes:
    controlling a harmonic conversion efficiency of the first beam into the second beam,
    controlling at least one focal lane relative to the workpiece surface by one of dis lacing non-achromatic optics, which generate the achromatic aberration along the path, or
    replacing the non-achromatic optics with another, which is configured with different refractive curvatures or made from different optical material such as Fused Silica, $CaF_2$, or $MgF_2$, or others capable of altering respective focal distances of the first and second beams, and
    the machining method is achieved with less total laser power at all wavelengths than would be required in the absence of the second beam.

2. The laser machining method of claim 1 further comprising:
    generating an axial chromatic aberration between the first and second beams such that the first beam has a focus within the workpiece at a distance from the surface, and the second beam has a second focus spaced upstream from the first focus.

3. The laser machining method of claim 1, wherein the harmonic wavelength of the second beam is selected from the group consisting of second, third, fourth harmonic wavelength, an independently tunable wavelength and a combination of these harmonic and tunable wavelengths by using a conversion method selected from an optical parametric conversion, Raman processes and a combination of the parametric and Raman conversion methods, the first and second beam impinging upon the workpiece surface at the same time and position.

4. The laser machining method of claim 1 further comprising: creating a plasma to increase the absorption coefficient of the workpiece for the first beam; and collimating achromatically the first and the second coaxial beams after the generation of the second beam by using one or more mirrors only.

5. A laser machining method of a workpiece comprising:
    converting a part of a first broadband unpolarized fiber laser beam at fundamental wavelength into at least one second broadband beam at a harmonic wavelength, wherein an unconverted portion of the first beam and the second beam are coaxially and temporally overlapped;
    guiding the first and second beams along a path through a non-achromatic optics, thereby generating chromatic aberration between the beams such that when the beams simultaneously impinge upon a surface of the workpiece, made from a material with different absorption coefficients at respective fundamental and harmonic wavelength, the second beam with a focus at the surface provides a material state change increasing the absorption coefficient in the workpiece for the first beam with a focus thereof spaced from the surface into or out of the workpiece with the first and second beams focused simultaneously at the different focal heights; and
    controlling a fluence ratio of the first and second beams, at respective fundamental and harmonic wavelength to provide the material state change such that the fluence ratio is greater than an inverted ratio of an absorption coefficient at the fundamental and harmonic wavelength,
    wherein controlling the fluence ratio comprises setting the different focal heights and controlling a harmonic conversion efficiency of the first beam into the second beam so as to;
    prevent degradation of a Gaussian intensity distribution of the first beam, which is a single or a multi-mode beam, to a donut-shaped intensity distribution during the conversion, or
    provide a donut-shaped intensity distribution profile of the first beam.

6. The laser machining method of claim 5, wherein the material state change is provided if the energy of each of the first and second beams incident on the workpiece is $$Eth(\lambda)/Ethall(\lambda)>1,$$

wherein $Eth(\lambda)$ is the energy threshold of the laser beam coupled into the workpiece at each individual fundamental or harmonic wavelength alone needed to accomplish the laser machining of workpiece by a single beam, and Ethall $(\lambda)$ is the energy threshold of the laser beam at the individual wavelength when the coaxial first and second beams impinge on the workpiece simultaneously.

7. The laser machining method of claim 5 further comprising:
    generating an electron plasma by the second beam upon impinging the surface of the workpiece which is made from a material having an absorption coefficient at the second beam wavelength higher than the absorption coefficient at the fundamental wavelength, wherein the second beam has the harmonic wavelength selected from second, third and fourth harmonic and a combination of these wavelength of the fundamental wavelength and/or independently tunable wavelength generated by optical parametric or Raman processes, and heating the surface of the workpiece made by the fundamental wavelength that significantly increases the absorption at the higher harmonic wavelength or wavelengths.

8. The laser machining method of claim 5 further comprising collimating achromatically the first and the second coaxial beams after the generation of the second beam by using one or more mirrors only, the first beam being single mode or multimode beam generated by a fiber laser operating in a pulsed, continuous wave (CW) or quasi CW (QCW) mode,
wherein the beam at the fundamental wavelength includes
a plurality of single and/or multi-mode laser light emitted at 0.9-2.1 μm wavelength range and having
a pulse duration in a seconds-femtosecond range,
an $M^2$ factor between 1 and 100,
a broad spectral line between 2 nm and hundreds of nm,
a pulse energy in a μJ-J range, and
an average power between single-digit watt and few hundreds of kilowatts;
the second beam spectral line width exceeding 0.5 nm.

9. A modular laser machining apparatus of a workpiece comprising:
a tunable harmonic generator operative to partially convert a first broadband unpolarized fiber laser beam at a fundamental wavelength into at least one second broadband beam with a predetermined conversion efficiency at a harmonic wavelength, the first and second beams being coaxial and temporally overlapped and simultaneously impinging upon a surface of the workpiece which has different absorption coefficients at respective fundamental and harmonic wavelength;
non-achromatic optics located between the tunable harmonic generator and the workpiece and operative to generate an axial chromatic aberration between the unconverted first and second beams such that the first beam has a focus within the workpiece at a distance from the surface, and the second beam has a second focus spaced upstream from the first focus closer to the surface with the first and second beams focused simultaneously at the different focal heights, the non-achromatic optics configured such that a fluence ratio between the first and second beams is at least equal to a threshold value at which the second beam provides a material state change on or near the surface so as to increase an absorption coefficient of the first beam; and
one of:
an actuator operative to configure the non-achromatic optics, by displacement, replacement, or displacement and replacement of the non-achromatic optics; or
the tunable harmonic generator comprising a system for controlling a harmonic conversion efficiency of the first beam into the second beam such that the threshold value is at least equal to the inverted ratio of absorption at the fundamental and harmonic wavelength.

10. The laser machining apparatus of claim 9 further comprising
a fluence measuring unit operative to measure the fluence, and
a processing unit operative to determine the fluence ratio and compare the measured fluence to the threshold value.

11. The laser machining apparatus of claim 9 wherein the tunable harmonic generator is operative to convert the first beam into the second beam for at least one of a second, third, and fourth harmonic wavelength.

12. A modular system for machining a workpiece, comprising:
a fiber laser source outputting a broadband first beam at a fundamental wavelength along a path;
a harmonic wavelength generator receiving the first beam and operative to partially convert the first beam into at least one second beam at a harmonic wavelength with a conversion efficiency, wherein the first and the second beams are coaxially and temporally overlapped;
an adjustable non-achromatic optics impinged upon by the coaxial first and second beams and configured to controllably generate a chromatic aberration such that the second beam has a focal plane on or near a surface of the workpiece providing an initial material state change sufficient to increase a temperature for a subsequent effective absorption of the first beam with a focal plane spaced away from the surface into a body of the workpiece and the first and second beams impinge on the workpiece simultaneously all together and are focused simultaneously at the different focal plane heights; and
a processing unit configured to
determine a fluence ratio of the first and second beams at respective fundamental and harmonic wavelength, and
adjust the non-achromatic optics such that the fluence ratio is larger or at least equal to an inverted ratio of absorption coefficients at the fundamental and harmonic wavelength.

13. The modular system of claim 12, wherein the harmonic generator is configured with:
one or more nonlinear crystals spaced from one another along the optical path by using only reflective focusing so as to selectively provide sequential conversion of the fundamental wavelength into one or more of a second, third and/or fourth harmonic wavelength, or at an independently tunable wavelength by using optical parametric and/or Raman processes and
a single or multi-pass wavelength conversion scheme, wherein the nonlinear crystals each are cut for either Type I or Type II phase-matching.

14. The modular system of claim 12 further comprising:
a collimator including a parabolic mirror which is located between the harmonic generator and the workpiece, and
wherein the processing unit is further operative to:
adjust a wavelength conversion efficiency of the harmonic generator to be larger than the inverted absorption coefficient ratio at each of the fundamental and harmonic wavelength, and control the wavelength conversion efficiency to
prevent degradation of a Gaussian intensity distribution of the first beam to a donut-shaped intensity distribution during the wavelength conversion, or
provide a donut-shaped intensity distribution profile of the first beam which can be a single mode or multimode beam.

15. The laser machining method of claim 12, wherein the fiber laser source operates so that the energy of each of the first and second beams incident on the workpiece is $Eth(\lambda)/Ethall(\lambda) > 1$, wherein Eth is the energy threshold of a single laser beam coupled into the workpiece at each individual fundamental or harmonic wavelength alone needed to accomplish the laser machining of workpiece by the single laser beam at the individual wavelength beam, and Ethall($\lambda$) is the energy threshold of the laser beam at the individual wavelength when the coaxial first and second beams impinge on the workpiece simultaneously all together, the fiber laser operating in a continuous wave (CW) mode or quasi-CW mode or pulsed mode and outputs the first beam in single or multi modes.

16. A method for laser machining comprising:

using a broadband unpolarized fiber laser beam to determine a desired harmonic fluence level at a target surface to effect a state change in the surface material, wherein the desired fluence level will at least initiate a laser machining process, setting a harmonic spot size, a conversion efficiency, and an unconverted beam power to achieve the desired harmonic fluence level, determining a fundamental spot size corresponding to the desired harmonic fluence and harmonic spot size, the fundamental beam comprising residual unconverted radiation, configuring a chromatic optical system to coaxially and simultaneously deliver the harmonic spot size and the fundamental spot size to the target surface, and delivering laser radiation to the target work surface with the chromatic optical system to efficiently process target material.

17. A multiple wavelength laser processing system comprising:
a multiple wavelength fiber laser source for generating a multiple wavelength coaxial laser processing beam with controlled conversion efficiency of one or more converted wavelengths,
a multiple wavelength optical system to deliver the coaxial laser processing beam to a laser-material interaction zone on the surface of a workpiece such that each of a first fundamental and a second harmonic laser wavelength in the processing beam simultaneously impinge at least a portion of the interaction zone as respective first and second concentric laser spots,
the multiple wavelength optical system comprising
a multiple wavelength beam collimator,
a configurable chromatic optic, and
a laser processing focus lens,
wherein the configurable chromatic optic provides an adjustment to the relative focus distance of the first and second laser wavelengths such that the first and second wavelengths are focused simultaneously at the different focal distances.

18. The system as in claim 17, wherein the diameter ratio of the first and second laser spots is adjusted by configuring the chromatic optic such that the smaller concentric spot is less than ½ the diameter of the larger concentric spot.

19. The system as in claim 17, wherein the configurable chromatic optic is removable from the path of the coaxial beam and is configured with:
a first chromatic optic with a first set of respective focal distances,
a second chromatic optic configured with a second set of respective focal distances, wherein the first chromatic optic is interchangeable with the second chromatic optic.

* * * * *